June 27, 1967
T. M. SCRUGGS
3,328,081
SAFETY SEAT BELT
Filed Oct. 28, 1963
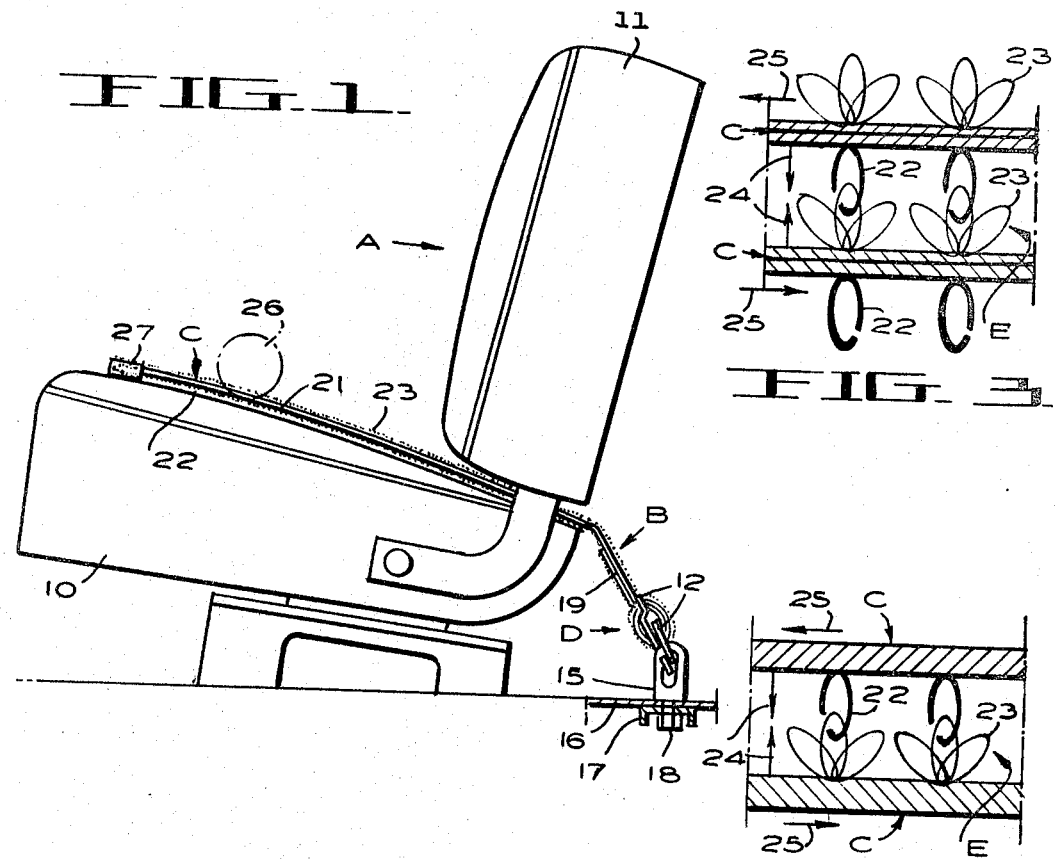
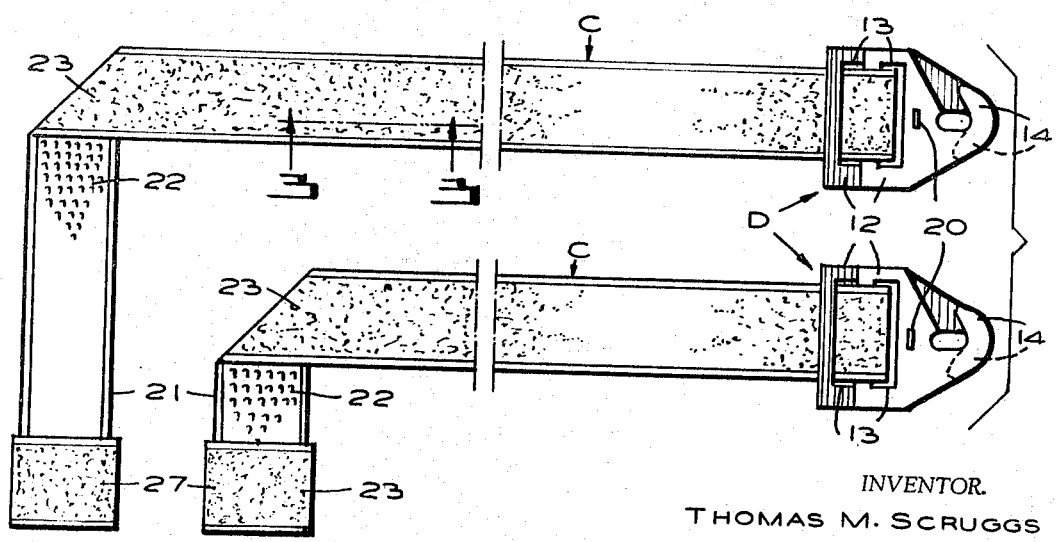
INVENTOR.
THOMAS M. SCRUGGS

United States Patent Office 3,328,081
Patented June 27, 1967

3,328,081
SAFETY SEAT BELT
Thomas M. Scruggs, 1250 Millbrae Ave.,
Millbrae, Calif. 94030
Filed Oct. 28, 1963, Ser. No. 319,357
3 Claims. (Cl. 297—385)

The present invention relates to improvements in a safety seat belt. It consists of the combinations, constructions, arrangement of parts, as hereinafter described and claimed.

It is a well known fact that safety seat belts are utilized in automobiles, airplanes, boats, and the like or any other seat, for restraining or holding the occupants in seats, thus protecting the occupants to at least some extent during sudden stops or accidents. However, such safety seat belts employ buckles or fasteners for securing the straps of the belts together across the occupants, which must be fastened each time the belt is used and then unfastened when the occupant desires to leave the seat. This cumbersome and somwehat time consuming practice results in part in failure of the occupant to use the seat belt, even if the latter is provided.

Accordingly, and as the cardinal object of my invention, it is proposed to provide a safety seat bealt in which a pair of straps are employed, one end of each strap being anchored relative to a seat, these straps having sufficient lengths so that they may extend across a selected part of an occupant of the seat, with the straps overlapping one another. Moreover, a separable fastening device is used for securing the lapping end sections of the straps together, with the fastening of the straps together being accomplished by merely pressing the lapping sections in face-to-face relation to thus resist shearing of the lapping end sections lengthwise relative to one another. However, the lapping strap sections may be easily and readily peeled apart by the occupant to release the latter.

More specifically stated, it is proposed to use a product now on the market and sold commercially under the trademark "Velcro" for the straps of the safety seat belt. This product is fully disclosed in United States Patent No. 3,009,235, granted to International Velcro Company, as assignee of George de Mestral, on Nov. 21, 1961, and Patent No. 2,717,437, granted to Velcro S.A., as assignee of George de Mestral, on Sept. 13, 1955.

Although the material for the straps is old, a non-analogous use is made thereof, combining the old material in a new organization, producing an unobvious result and requiring the exercise of inventive skill.

Drawing

For a better understanding of the invention, reference should be had to the accompanying drawing, forming part of this specification, in which:

FIGURE 1 is an end elevational view of a seat showing my safety seat belt applied thereto;

FIGURE 2 is a fragmentary plan view of a pair of straps used for the safety seat belt, the free ends being axially rotated 180° so as to expose the under side faces of the straps;

FIGURE 3 is a diagrammatic view on an enlarged scale and taken along the longitudinal plane 3—3 of FIGURE 2, disclosing the pair of straps being made of "Velcro" material of one type; and FIGURE 4 is a sectional view similar to FIGURE 3, but showing another type of "Velcro" material.

While I have shown only the preferred forms of my invention, it should be understood that various changes, or modifications, may be made within the scope of the appended claims, without departing from the spirit thereof.

Detailed description

Refering now to the drawing in detail, I have shown a conventional seat that is designated generally at A in FIGURE 1, but I desire to point out that this seat has been selected for purposes of illustration only. As indicated above, this seat may be used in automobile, airplane, boat or the like or any other seat. My safety seat belt is indicated by the reference character B, and it defines a pair of straps C (see FIGURE 2), each having anchoring means D at one end thereof for securing the straps relative to the seat A in operative position, with these straps passing between the seat portion 10 and the backrest 11, as shown in FIGURE 1 of the drawing.

While any suitable means D may be employed, I have disclosed a pair of clips 12 adjustably anchored to the straps C by passing these straps through slots 13 fashioned in the clips (see FIGURE 2). These clips are fashioned with hooks 14 that may be engaged with eye bolts 15 that are fixed to a floor 16 by washers 17 and nuts 18, the latter being threaded on the lower ends of the eye bolts (see FIGURE 1). After the ends 19 of the straps have been pulled through the slots 13 of the clips 12 so that a desired length of each strap will extend forwardly of the brackrest 11, cotter pins 20 are inserted through openings provided in the clips.

The straps C have sufficient lengths so that they may extend across a selected part of an occupant of the seat A, for instance, across the lap of the occupant. The straps have end sections 21 disposed to overlap one another, with the lapping sections extending generally lengthwise of each other so that the straps will be arranged around the occupant to hold the latter in place relative to the seat.

As previously stated, the straps C are made of "Velcro" material that is fully shown in United States Patent No. 3,009,235, providing a separable fastening device E for removably securing the lapping end sections 21 of the straps together. Two forms of the fastening device are illustrated in FIGURES 3 and 4 on enlarged scales. Patent No. 2,717,437 shows further details of "Velcro."

It will be noted from FIGURE 3 that hooks 22 have their roots secured to the lapping section of one of the straps, with the hooks projecting from a face of this strap. Looped pile 23 is secured to the lapping section of the other strap to project from a face of this strap. The hooks and pile may be made from suitable flexible material, such as nylon. The hooks 22 are disposed to engage and interlock with the pile 23, when the lapping sections are pressed toward one another in face-to-face relation, as suggested by the arrows 24, to thus resist shearing of the lapping sections relative to one another, as suggested by the arrows 25. The highest shearing strength of the material of the straps will be effected over a curve or angle, for instance, when the straps are curved over a selected part of the occupant, since the hooks will tend to be pulled into the loops of the pile.

This "Velcro" material is now made with hooks 22 on only one face thereof, the opposite face of the material being plain. Likewise, "Velcro" material may be obtained with looped pile 23 on only one face thereof, the opposite face being plain. This type of "Velcro" is illustrated diagrammatically in FIGURE 4. It is obvious that one strap C may be made from one of these types of "Velcro" and the other strap C fashioned from the other type just mentioned.

However, FIGURE 3 discloses a type of the "Velcro" material in which the lapping sections of each strap C has hooks 22 projecting from one face thereof and looped pile 23 projecting from its opposite face, whereby the hooks of either strap may be selectively engaged with the looped pile of the other strap, regardless of which strap is disposed uppermost over the other strap. This will facilitate placing of the straps around a selected part of the occupant of the seat A, since the occupant need not determine which strap must be placed uppermost.

Both straps C are flexible so that a free end section of each strap may be rolled upon itself, as indicated by the roll 26 in FIGURE 1, with the hooks 22 on one strap engaging with the looped pile 23 on the opposite face of the same strap, whereby the effective lengths of the straps may be regulated. Moreover, the hooks and pile may be provided along the entire lengths of the straps C, whereby the straps may be accommodated to various girths of the selected part of the occupant of the seat over which the straps are passed.

As shown in FIGURES 1 and 2, the outer ends of the straps C may have strips 27 of the "Velcro" material wrapped transversely therearound and anchored thereto by the hooks 22 and pile 23 to provide hand grasps. This will facilitate securing of the lapping sections of the straps together and subsequent peeling of the lapping sections apart.

Thus it will be apparent that my safety seat belt B does not require the use of any buckles or other fastening means since the hooks 22 and looped pile 23 provide the necessary separable fastening device E, and this arrangement will encourage the use of the safety seat belt. Actual tests show that "Velcro" material will accomplish the desired result.

In FIGURE 3, each strap C is composed of two parts, the hooks 22 being secured to one part and the looped pile 23 being secured to the other part, and these parts being bonded together in back-to-back relation.

As shown in FIGURES 3 and 4, hooks 22 are shown with their planes oriented substantially parallel to the longitudinal axis of straps C. Furthermore, the hook portions of hooks 22 are also longitudinally oriented in the same direction away from the free end of strap C so that as straps C move in the direction of arrows 25, substantially all of the hooks 22 will engage loops 23 to insure greater holding power.

The fastening means described in the above application is equally applicable to safety belts comprising a single strap and having a single point of attachment to an anchoring means.

I claim:
1. In a safety seat belt for a vehicle comprising:
 (a) a pair of straps, each having means at one end thereof for anchoring the strap relative to a seat;
 (b) the straps having sufficient lengths so that the straps may extend across a selected part of an occupant of the seat;
 (c) the straps having end sections disposed to overlap one another, with lapping end sections extending generally lengthwise of each other;
 (d) and a separable fastening device for removably securing the lapping end sections of the straps together and having:
  (1) hooks oriented with their planes substantially parallel to the longitudinal axis of said strap having their roots secured to the lapping section of one of the straps, with the hooks projecting from a face of this strap, and the hook ends facing in a direction away from the end of this strap;
  (2) and pile secured to the lapping section of the other strap to project from a face of this strap;
  (3) the hooks being disposed to engage and interlock with the pile, when the lapping sections are pressed toward one another in face-to-face relation to thus resist shearing of the lapping sections lengthwise relative to one another;
  (4) the hooks being disposed to disengage themselves from engagement with the pile when the lapping sections of the straps are peeled apart;
 (e) said straps forming an arcuate configuration about the front and sides of said occupant so that upon sudden deceleration of said vehicle the overlapped sections are held more firmly together by the combination of the force of said occupant's body upon a portion of said overlapped belt sections and the opposite directional force exerted by said anchoring means; and
 (f) said lapping sections of each strap having hooks projecting from one face thereof and pile projecting from its opposite face, whereby the hooks of either strap may be selectively engaged with the pile of the other strap, regardless of which strap is disposed uppermost over the other strap.

2. The safety seat belt, as set forth in claim 1;
 (g) and in which both straps are flexible so that a free end section of each strap may be rolled upon itself, with the hooks on one strap engaging with the pile on the opposite face of the same strap, whereby the effective lengths of the straps may be regulated.

3. In a safety seat belt for a vehicle comprising:
 (a) a pair of straps, each having means at one end thereof for anchoring the strap relative to a seat;
 (b) the straps having sufficient lengths so that the straps may extend across a selected part of an occupant of the seat;
 (c) the straps having end sections disposed to overlap one another, with the lapping sections extending generally lengthwise of each other;
 (d) and a separable fastening device for removably securing the lapping end sections of the straps together and having:
  (1) hooks having their roots secured to the lapping sections of one strap, with the hooks projecting from a face of this strap, said hooks being oriented with their planes substantially parallel to the longitudinal axis of said strap with the hook ends facing in a direction away from the strap end;
  (2) and pile secured to the lapping section of the other strap to project from a face of this strap;
  (3) the hooks being disposed to engage and interlock with the pile, when the lapping sections are pressed toward one another in face-to-face relation to thus resist shearing of the lapping sections lengthwise relative to one another;
  (4) the hooks being disposed to disengage themselves from engagement with the pile when the lapping sections of the straps are peeled apart;
 (e) the lapping sections of each strap having the hooks projecting from one face thereof and the pile projecting from its opposite face, whereby the hooks of either strap may be selectively engaged with the pile of the other strap, regardless of which strap is disposed uppermost over the other strap;
 (f) both straps being flexible so that a free end section of each strap may be rolled upon itself, with the hooks on one strap engaging with the pile on the opposite face of the same strap, whereby the effective lengths of the straps may be regulated;
 (g) the hooks and pile being provided along substantially the entire lengths of both straps, whereby the straps may be accommodated to various girths of the selected part of the occupant of the seat, and
 (h) said straps forming an arcuate configuration about the front and sides of said occupant so that upon sudden deceleration of said vehicle the overlapped sections are held more firmly together by the combination of the force of said occupant's body upon a portion of said overlapped belt sections and the opposite directional force exerted by said anchoring means.

References Cited

UNITED STATES PATENTS

| | | |
|---|---|---|
| 2,717,437 | 9/1955 | De Mestral. |
| 2,976,914 | 3/1961 | Miller. |
| 3,009,235 | 11/1961 | De Mestral. |
| 3,027,566 | 4/1962 | Ruby. |
| 3,096,122 | 7/1963 | Connell _____ 297—385 |
| 3,136,311 | 6/1964 | Lewis. |
| 3,241,881 | 3/1966 | Carnahan. |

DAVID J. WILLIAMOWSKY, *Primary Examiner.*

FRANK B. SHERRY, JAMES T. McCALL, *Examiners.*

J. S. PETRIE, *Assistant Examiner.*